INVENTOR:
ROBERT TREVOR ALLSOP
BY Kurt Kelman
AGENT

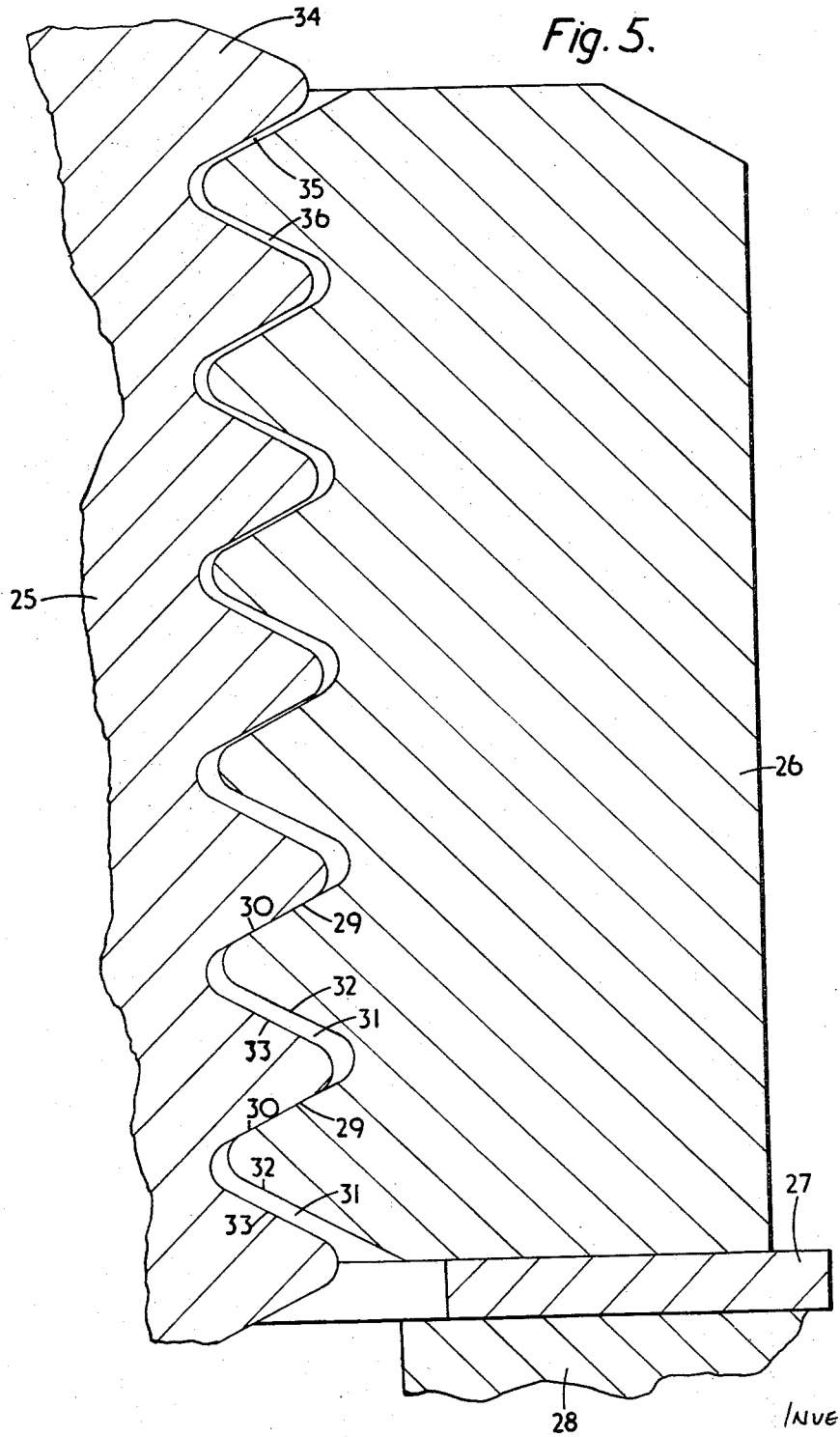

United States Patent Office 3,370,341
Patented Feb. 27, 1968

3,370,341
METHOD OF AND APPARATUS FOR USE IN TIGHTENING A NUT AND BOLT ASSEMBLY
Robert T. Allsop, Storton, near Stourbridge, England, assignor to G.K.N. Screws & Fasteners Limited, Birmingham, England, a British company
Filed Dec. 20, 1965, Ser. No. 514,796
5 Claims. (Cl. 29—413)

This invention relates to the tightening of nuts upon bolts in nut and bolt assemblies, and, in this text, the expression "nut and bolt assembly" is to be taken as meaning an assembly in which two or more members are secured together by means of an internally threaded nut engaging an externally threaded shank, which shank may be the shank of a conventional bolt having a head, or may be the threaded shank of a stud fixed at its one end in some other member.

The efficiency of a nut and bolt assembly is dependent upon the nut being tightened to a certain extent which will achieve a predetermined minimum tension, at least, in the bolt shank and there have previously been various proposals for nuts having indicating characteristics such as to enable an operator tightening a nut upon a bolt to be aware when the desired position had been reached and the desired tension achieved in the bolt shank.

In certain of such prior proposals, use is made of a relationship between the torque applied to the nut and the resultant tension in the bolt shank and there has, hitherto, been proposed, a type of nut having an unthreaded wrenching portion connected to the main internally threaded body of the nut by an unthreaded neck portion of reduced cross-section forming a weakened portion connecting the wrenching portion to the main body and adapted to shear under torsion upon the application of a predetermined torque when the wrenching portion is engaged by a wrench or the like in the tightening of the nut upon a bolt. However, a drawback to the use of this type of nut is the fact that, for each nut applied, the wrenching portion which is sheared off goes to waste and thus the cost of the nut is considerably increased as compared with the cost of a conventional nut. Consequently, where nuts are used in very large quantities, as on assembly-line work, the aforesaid nuts, having a separate shearable wrenching portion, are uneconomical.

The principal object of the invention is to provide an improved method of tightening nuts in nut and bolt assemblies so as to enable nuts to be tightened to a predetermined figure of applied torque.

A further object of the invention is to provide an improved compound nut for use in such a method, which compound nut will be more economical in use than nuts of this type as used hitherto.

Figure 1:
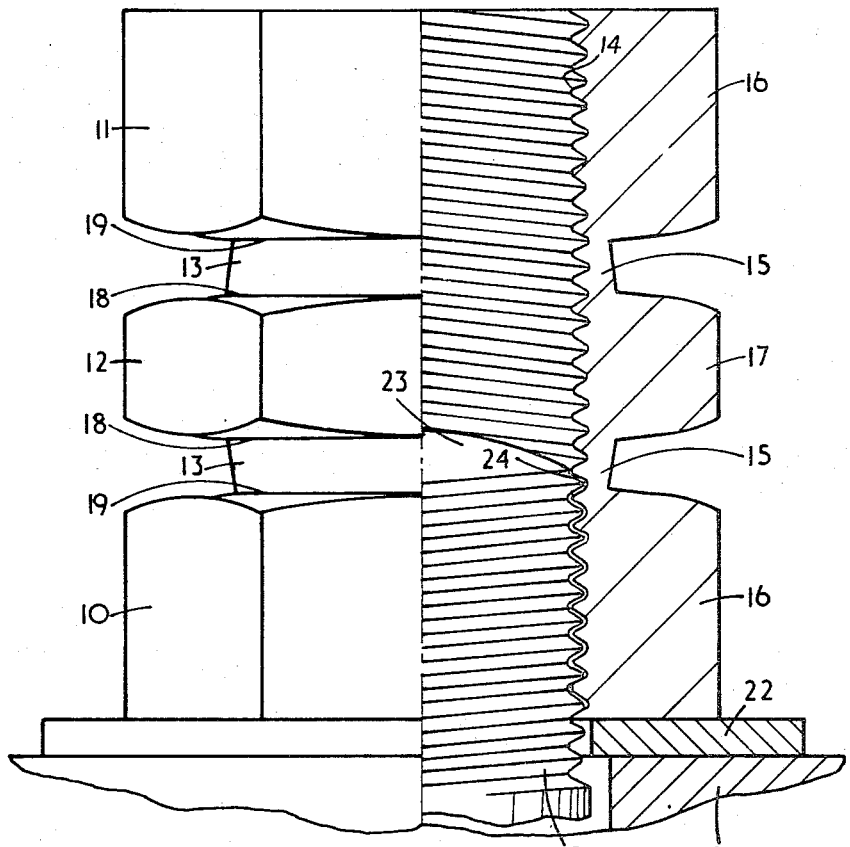
Figure 2:
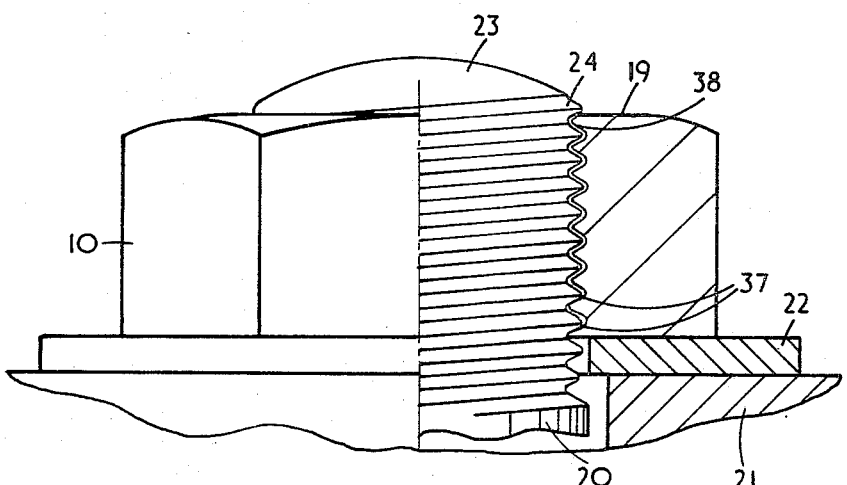
Figure 3:
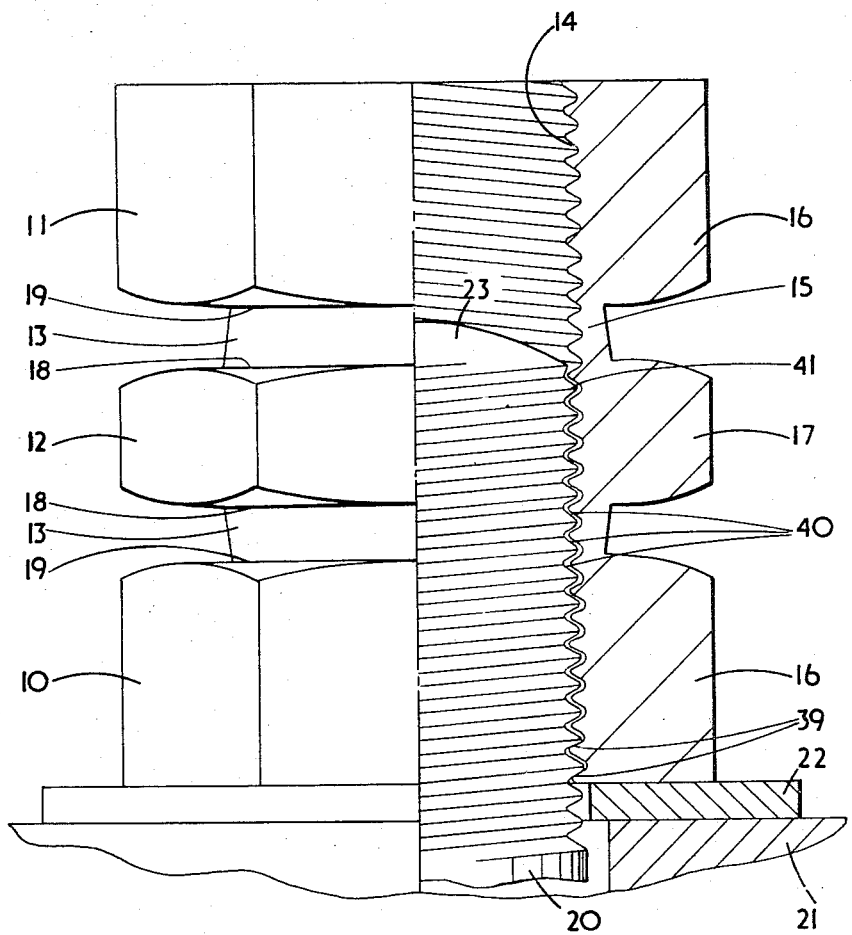
Figure 4:
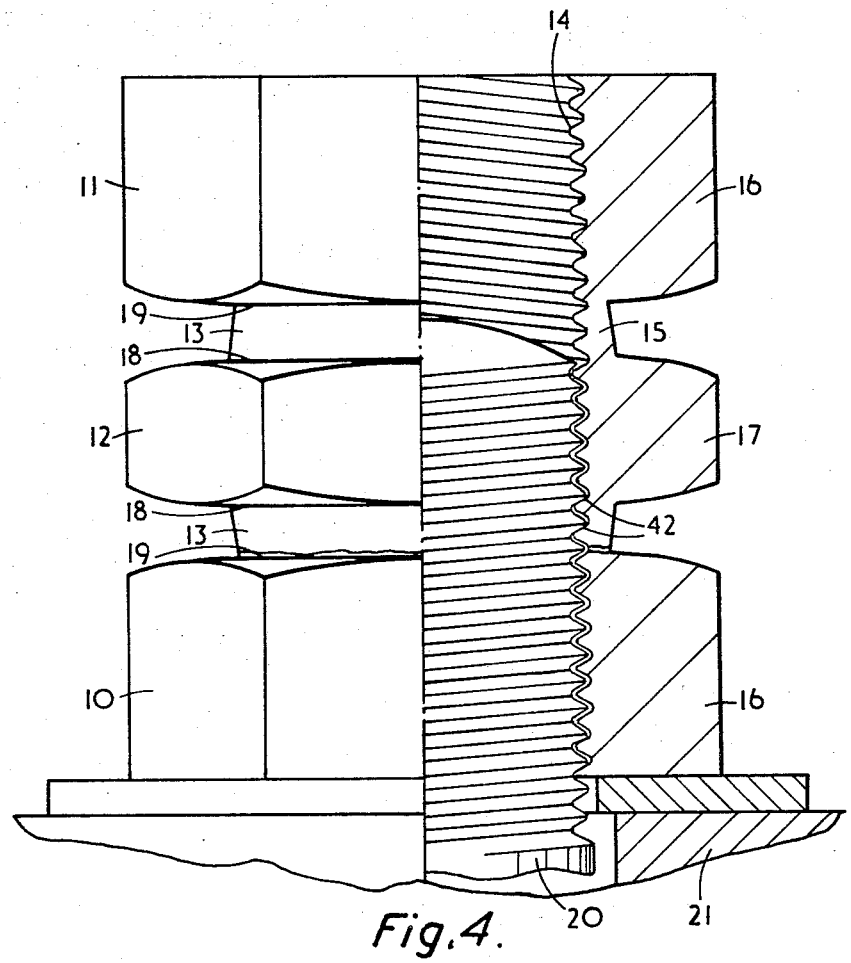

The invention is illustrated in the accompanying drawings wherein:

FIGURE 1 is a side elevation partly sectioned showing a compound nut applied to the end of a bolt in a nut and bolt assembly, FIGURE 2 is a side elevation partly sectioned showing a nut tightened on a bolt after shearing off from the compound nut, FIGURE 3 is a view similar to FIGURE 1 but showing a different case, wherein the bolt has a longer threaded shank, FIGURE 4 is a view similar to FIGURE 3 and showing the position at the moment of shearing of the compound nut member, FIGURE 5 is a fragmentary view on a very large scale taken in section to illustrate the threaded engagement between a nut and a bolt.

The compound nut member shown in FIGURES 1 and 3 comprises first and second nut bodies 10 and 11 respectively, between which is interposed a wrenching section 12 which is connected to the nut bodies 10 and 11 by neck sections 13.

In the example shown the nut bodies 10 and 11 are identical in shape and size and each has an hexagonal external shape corresponding to that of a conventional nut and the wrenching section 12 also has a similar hexagonal external shape and is therefore adapted to be non rotatively engaged by a normal wrench member.

By virtue of this formation of the nut bodies 10 and 11 and the wrenching section 12 the compound nut member may be conveniently and economically manufactured from bar of hexagonal cross section by cutting an appropriate length of the bar corresponding to the overall axial length of the compound nut member and then producing the reduced neck sections 13 by suitable machining operations.

The compound neck member has an axial passage extending therethrough which is provided with an internal screw thread 14 which is continuous throughout the two nut bodies 10 and 11 and through the wrenching section 12 and the two neck sections 13.

It will be observed that each neck section 13 has a wall thickness 15 which is considerably less than the wall sections 16 and 17 of the nut bodies and the wrenching section so that each neck section constitutes a weakened section, the effective cross-sectional area of which is such that it will shear under a predetermined torque.

Furthermore, it will be observed that each neck section is of generally frusto-conical form, being connected at its larger diameter end 18 to the wrenching section 12 so that the weakest portion of the neck section is across the plane 19 where it joins its associated nut body, and therefore under the aforesaid predetermined torque the neck section will shear away from its associated nut body across the plane 19 which is the plane defining the outer end face of a nut when it is in its normal position on a bolt.

Referring now to FIGURES 1 and 2, the compound nut member above described is applied to the threaded end 20 of a bolt which is being used to clamp two or more members together in a nut and bolt asembly, one of such members being indicated at 21, and there also being provided in accordance with general practice a washer 22 to engage under the nut between the nut and the member 21.

The compound nut member is used in the manner shown in FIGURE 1 by applying the first nut body 10 to the threaded end 20 of the bolt and tightening this nut body 10 down upon the washer 22 in the normal manner by engaging a wrench member with the wrenching section 12 so that torque is transmitted from this wrenching section 12 to the nut body 10, which is therefore tightened down in the normal way until the tightening torque reaches the predetermined magnitude at which the wrenching section 13 shears off from the nut body 10 across the plane 19 and thereafter no further torque is transmitted to the nut body 10, and it is known that the nut and bolt assembly 10 to 20 has been correctly tightened to achieve the desired tension in the shank of the bolt.

The remainder of the compound nut member comprising the wrenching section 12 and second nut body 11 is removed from the end of the bolt 20 and is then applied to a further bolt to tighten the second nut body 11 onto a second nut and bolt assembly in the same manner as before, utilising a wrench member engaging the wrenching section 12 and transmitting the torque to the second nut body 11 through the neck section 13 until again torque of predetermined magnitude is reached and the wrenching section 12 shears away from the second nut body 11, again across the the plane 19.

After such application of the second nut body 11 there is left the wrenching section 12, having attached to its opposite end faces the two neck sections 13, which, even if thrown to waste, still enables a considerable saving in cost and material as opposed to the prior arrangements involving the disposal to waste of a separate wrenching section for each nut.

However, as the wrenching section 12 is itself internally threaded and is of the same shape as a nut it may be recovered and suitably cleaned up by operating upon the neck section 13 to provide a conventional nut which may find use elsewhere.

In a well designed nut and bolt assembly such as is illustrated in FIGURES 1 and 2 the length of the bolt will be chosen such that the extremity 23 of the bolt will only project a very short distance beyond the end face 19 of the nut, to the extent approximately of one thread convolution 24 and therefore, as will be seen in FIGURE 1, the extremity of the bolt, although projecting into the neck section 15, only has very limited thread engagement therewith. As the extremity 23 has a slight taper and its end thread 24 is somewhat reduced in radial dimension, this means that at the moment of shearing the neck section 13 can make the necessary amount of angular rotation relative to the first nut body 10 to enable complete shearing to take place across the plane 19.

However, in certain cases, as illustrated in FIGURES 3 and 4, the length of the bolt 20 may be such that its extremity 23 passes right into the wrenching section 12 and the position which obtains at the moment of shearing can best be understood by first referring to FIGURE 5, which is a very enlarged diagrammatic illustration of the engagement between the thread of a bolt 25 and a nut 26. In this case the nut 26 has been tightened down on the bolt 25 against an abutment in the form of a washer 27 interposed between the nut and a part 28 of the assembly.

It is known in a nut and bolt assembly that the majority of the load imposed upon the nut is taken upon the first two or three of the thread convolutions adjacent the abutment, and this means, with reference to FIGURE 5, that the flanks 29 of these first engaged thread convolutions are hard up against the flanks 30 of the thread of the bolt 25 whilst on the opposite side there is clearance at 31 between the flanks 32 of the nut thread and the flanks 33 of the bolt thread.

Progressing along the axis of the bolt towards its extremity 34 the hard engagement between the flanks of the two threads gradually decreases until at the outer end of the bolt threads there is clearance 35 and 36 between both flanks of the nut thread and the corresponding flanks of the bolt thread.

It will be appreciated that in FIGURE 5 the clearances 31, 35 and 36 have been greatly exaggerated in order to make the explanation clear.

Following the explanation above given it will be observed that in a well designed nut and bolt assembly such as shown in FIGURES 1 and 2, when the nut body 10 is correctly tightened there is hard engagement between the cooperating thread flanks, as shown at 37, over the first two or three engaged threads of the nut, and clearance 38 between the cooperatnig nut and bolt threads at the end of the bolt; again, in FIGURES 1 and 2 such clearance has been greatly exaggerated for the purposes clarity.

Turning now to a consideration of FIGURES 3, and 4, FIGURE 3 illustrates the position reached just prior to the attaining of torque of predetermined magnitude, and it will be observed that in the nut body 10 there is hard engagement at 39 between the cooperating threads of the nut body and bolt, whereas at 40 and elsewhere throughout the engagement between the bolt and wrenching section 12 there is clearance between the cooperating threads right up to the extremity of the bolt where the clearance is indicated at 41 in FIGURE 3. Again, it will be appreciated that in all cases these clearances have been greatly exaggerated for the purposes of clarity.

Thus, when shearing takes place across the plane 19 as illustrated in FIGURE 4, the wrenching section 12 is still able to make the required amount of angular rotation relative to the nut body 10 because now the nut body 10 may be regarded as in abutment with the wrenching section 12 being tightened down against this abutment so that the clearance previously present at the position 40 in FIGURE 3 is now taken up and hard engagement results, as at 42 in FIGURE 4, between the threads within the neck section 13 and wrenching section 12, such taking up of the clearance being sufficient to permit the wrenching section 12 to make the amount of angular rotation relative to the nut body 10 necessary to ensure complete shearing of the neck section 13 across the plane 19.

Thus, in this case, after shearing has taken place, it is necessary to apply torque in the reverse direction to the wrenching section 12 in order to remove the remainder of the compound nut from the threaded end of the bolt.

What I claim then is:

1. Method of tightening nuts in each of two nut and bolt assemblies comprising:
   (a) providing a compound nut member comprising two internally threaded nut bodies disposed in axial alignment and a wrenching section located in between said nut bodies and connected to each nut body by a neck section adapted to shear upon application of a predetermined torque thereto,
   (b) applying one end of said compound nut member to the first bolt of said two assemblies so as to cause threaded engagement between a first of said two nut bodies and the thread of said first bolt,
   (c) applying torque to said wrenching section to cause tightening of said first nut body upon said first bolt and continuing application of torque to cause shearing of the neck section between said first nut body and said wrenching section,
   (d) removing said wrenching section and the attached second of said two nut bodies from the assembly of said first bolt and nut body,
   (e) applying said second nut body to the second bolt of said two assemblies so as to cause threaded engagement between said second nut body and the thread of said second bolt,
   (f) applying torque to said wrenching section to cause tightening of said second nut body upon said second bolt and continuing application of torque to cause shearing of the neck section between said second nut body and said wrenching section, and
   (g) removing said wrenching section from the assembly of said second bolt and nut body.

2. A compound nut member for use in tightening nuts in each of two nut and bolt assemblies comprising
   (a) a first nut body having an internally threaded opening extending therethrough,
   (b) a second nut body having an internally threaded opening extending therethrough, disposed in axial alignment with and spaced from said first nut body,
   (c) a wrenching section having an external shape adapted for non-rotative engagement with a wrench disposed between said first and second nut bodies,
   (d) a first neck section connecting said first nut body to said wrenching section and constructed so as to shear off from said first nut body upon application of torque of predetermined magnitude and
   (e) a second neck section connecting said second nut body to said wrenching section and constructed so as to shear off from said second nut body upon application of torque of predetermined magnitude.

3. A compound nut member according to claim 2 wherein said first and second neck section are formed integrally with said wrenching section and with said first and second nut bodies respectively.

4. A compound nut member according to claim 3 wherein said first and second nut bodies are identical, said wrenching section and neck sections have an internal opening extending axially therethrough and provided with an internal thread which is the same as, and continuous with, the internal threads in said nut bodies and wherein said neck sections are identical and have a wall thickness which is considerably less than the wall thickness of the wrenching section.

5. A compound nut member according to claim 4 wherein the external cross-sections of the nut bodies and the wrenching section are identical.

References Cited
UNITED STATES PATENTS

| | | | |
|---|---|---|---|
| 1,457,749 | 6/1923 | Rast | 85—61 |
| 3,040,425 | 6/1962 | Muenchinger | 29—413 |
| 3,174,385 | 3/1965 | Hallowell | 85—61 |
| 3,299,499 | 1/1967 | Ruminsky | 29—413 |

THOMAS H. EAGER, *Primary Examiner.*